(12) United States Patent
Smirnov

(10) Patent No.: US 7,603,186 B2
(45) Date of Patent: Oct. 13, 2009

(54) ADAPTIVE RESPONSE TIME CLOSED LOOP CONTROL ALGORITHM

(75) Inventor: Alexei V. Smirnov, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 353 days.

(21) Appl. No.: 11/413,780

(22) Filed: Apr. 28, 2006

(65) Prior Publication Data

US 2007/0276545 A1    Nov. 29, 2007

(51) Int. Cl.
*G06F 19/00* (2006.01)

(52) U.S. Cl. .................. 700/37; 700/28; 700/32; 700/42; 700/282; 137/2; 137/486; 702/100

(58) Field of Classification Search .......... 700/28, 700/32, 37, 42, 282; 137/2, 486; 702/100
See application file for complete search history.

(56) References Cited

U.S. PATENT DOCUMENTS

| | | | |
|---|---|---|---|
| 4,218,733 A | | 8/1980 | Maselli |
| 5,129,418 A | | 7/1992 | Shimomura |
| 5,394,322 A | * | 2/1995 | Hansen .................. 700/37 |
| 5,410,495 A | | 4/1995 | Ramamurthi |
| 5,609,136 A | * | 3/1997 | Tuken .................. 123/357 |
| 5,691,896 A | * | 11/1997 | Zou et al. ............... 700/37 |
| 6,272,401 B1 | * | 8/2001 | Boger et al. ............ 700/282 |
| 6,289,923 B1 | | 9/2001 | Ohmi |
| 6,314,992 B1 | | 11/2001 | Ohmi |
| 6,389,364 B1 | * | 5/2002 | Vyers .................... 702/45 |
| 6,445,980 B1 | * | 9/2002 | Vyers .................... 700/282 |
| 6,453,261 B2 | * | 9/2002 | Boger et al. ............ 702/138 |
| 6,466,893 B1 | * | 10/2002 | Latwesen et al. ......... 702/179 |
| 6,575,027 B1 | * | 6/2003 | Larsen et al. ............ 73/204.17 |
| 6,598,617 B2 | * | 7/2003 | Spicer .................. 137/391 |
| 6,712,084 B2 | | 3/2004 | Shajii |
| 6,714,878 B2 | * | 3/2004 | Vyers .................... 702/45 |
| 6,745,084 B2 | * | 6/2004 | Boger et al. ............ 700/13 |
| 6,782,906 B2 | | 8/2004 | Chang |

(Continued)

FOREIGN PATENT DOCUMENTS

WO    WO 2003/100391    12/2003

(Continued)

OTHER PUBLICATIONS

International Search Report and Written Opinion, Mailed Jul. 21, 2008; Lee W. Young; Alexandria, VA, USA.

*Primary Examiner*—Michael D Masinick
(74) *Attorney, Agent, or Firm*—Neugeboren O'Dowd PC; Sean R. O'Dowd

(57) ABSTRACT

A system and method for controlling a flow of a fluid using an adaptive closed-loop-control algorithm is described. One embodiment includes a method for receiving a set point indicator and/or a sensor indicator generated by a sensor. A response time of a closed-loop-control algorithm is modified when at least one threshold value is satisfied based on the sensor indicator and/or the set point indicator. The closed-loop-control algorithm, which is implemented by a flow controller, is stabilized in response to the modifying of the response time of the closed-loop-control algorithm by adjusting at least one parameter associated with the closed-loop-control algorithm.

25 Claims, 7 Drawing Sheets

U.S. PATENT DOCUMENTS

| | | | |
|---|---|---|---|
| 6,843,122 | B2 | 1/2005 | Kim |
| 6,868,862 | B2 | 3/2005 | Shajii et al. |
| 6,932,098 | B2 | 8/2005 | Shajii |
| 6,955,072 | B2 | 10/2005 | Zarkar |
| 6,962,164 | B2 * | 11/2005 | Lull et al. ............ 137/2 |
| 7,069,944 | B2 * | 7/2006 | Morikawa et al. ...... 137/487.5 |
| 7,073,392 | B2 * | 7/2006 | Lull et al. ............ 73/861 |
| 7,107,108 | B2 * | 9/2006 | Woergoetter et al. ...... 700/39 |
| 2001/0037159 | A1 * | 11/2001 | Boger et al. ............ 700/52 |
| 2003/0141925 | A1 * | 7/2003 | Lennous ............ 327/553 |
| 2003/0236592 | A1 | 12/2003 | Shajii et al. |
| 2004/0074311 | A1 | 4/2004 | Lull |
| 2004/0122353 | A1 | 6/2004 | Shahmirian et al. |
| 2005/0027373 | A1 | 2/2005 | Woergoetter et al. |
| 2005/0166968 | A1 | 8/2005 | Lull |
| 2005/0167627 | A1 | 8/2005 | Lull |
| 2005/0223813 | A1 | 10/2005 | Lull |

FOREIGN PATENT DOCUMENTS

| | | |
|---|---|---|
| WO | WO 2004/001516 | 12/2003 |
| WO | WO 2004/010234 | 1/2004 |

* cited by examiner

ADAPTIVE RESPONSE TIME CLOSED LOOP CONTROL ALGORITHM

FIELD OF INVENTION

The present invention relates to control systems, and in particular, but not by way of limitation, the present invention relates to systems and methods for controlling a flow of a fluid using an adaptive closed-loop-control algorithm.

BACKGROUND

A closed-loop proportional-integral-derivative (PID) control algorithm can be tuned to have a response time (e.g., accelerated response time) to meet the control requirements of a fluid flow application. But, tuning the response time of a closed-loop PID control algorithm to meet the requirements of a specific application can have undesirable side-effects. For example, a closed-loop PID control algorithm that is tuned as a fast algorithm to respond quickly to sudden, significant changes in the flow of a fluid may cause noisy flow when fluid flow is stable. A fast algorithm amplifies high frequency sensor, analog-to-digital converter (ADC) quantization, and electronics noise, resulting in noisy control signals.

A closed-loop PID control algorithm, on the other hand, tuned to have a slow response time may not introduce noise into a stable fluid flow, but may not be able to accurately and quickly correct for sudden, significant changes in flow conditions (e.g., sudden changes in set point or changes in pressure). The problems associated with implementing only a fast or a slow response time algorithm can be complicated by non-idealities such as, for example, lagging flow sensor readings or non-linearities in flow controller components. Accordingly, a need exists to address the shortfalls of present methodologies and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims The present invention can provide a system and method for controlling a flow of a fluid using an adaptive closed-loop-control algorithm. In one embodiment, a method includes receiving a set point indicator and/or a sensor indicator generated by a sensor. A response time of a closed-loop-control algorithm is modified when at least one threshold condition is satisfied based on the sensor indicator and/or the set point indicator. The closed-loop-control algorithm, which is implemented by a flow controller, is stabilized in response to the modifying of the response time of the closed-loop-control algorithm by adjusting at least one parameter associated with the closed-loop-control algorithm.

In another embodiment, a method receives a set point indicator and/or a sensor indicator generated by a sensor. A feedback filter that is associated with a closed-loop-control algorithm is modified from a first mode to a second mode based on the sensor indicator and/or the set point indicator. The closed-loop-control algorithm is associated with a flow controller. A tuning parameter associated with the closed-loop-control algorithm is changed to stabilize the closed-loop-control algorithm when the feedback filter is modified.

In yet another embodiment, an apparatus includes a processor and a valve. The processor is configured to modify a response time of a closed-loop-control algorithm when one or more threshold conditions are satisfied based on a set point indicator and/or a sensor indicator generated by a sensor. The processor modifies the response time of the closed-loop-control algorithm by modifying a feedback filter associated with the closed-loop-control algorithm and a tuning parameter associated with the closed-loop-control algorithm. The valve is configured to open and close in response to a control indicator generated by the processor based on the closed-loop-control algorithm.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein

DETAILED DESCRIPTION

Figure 1:
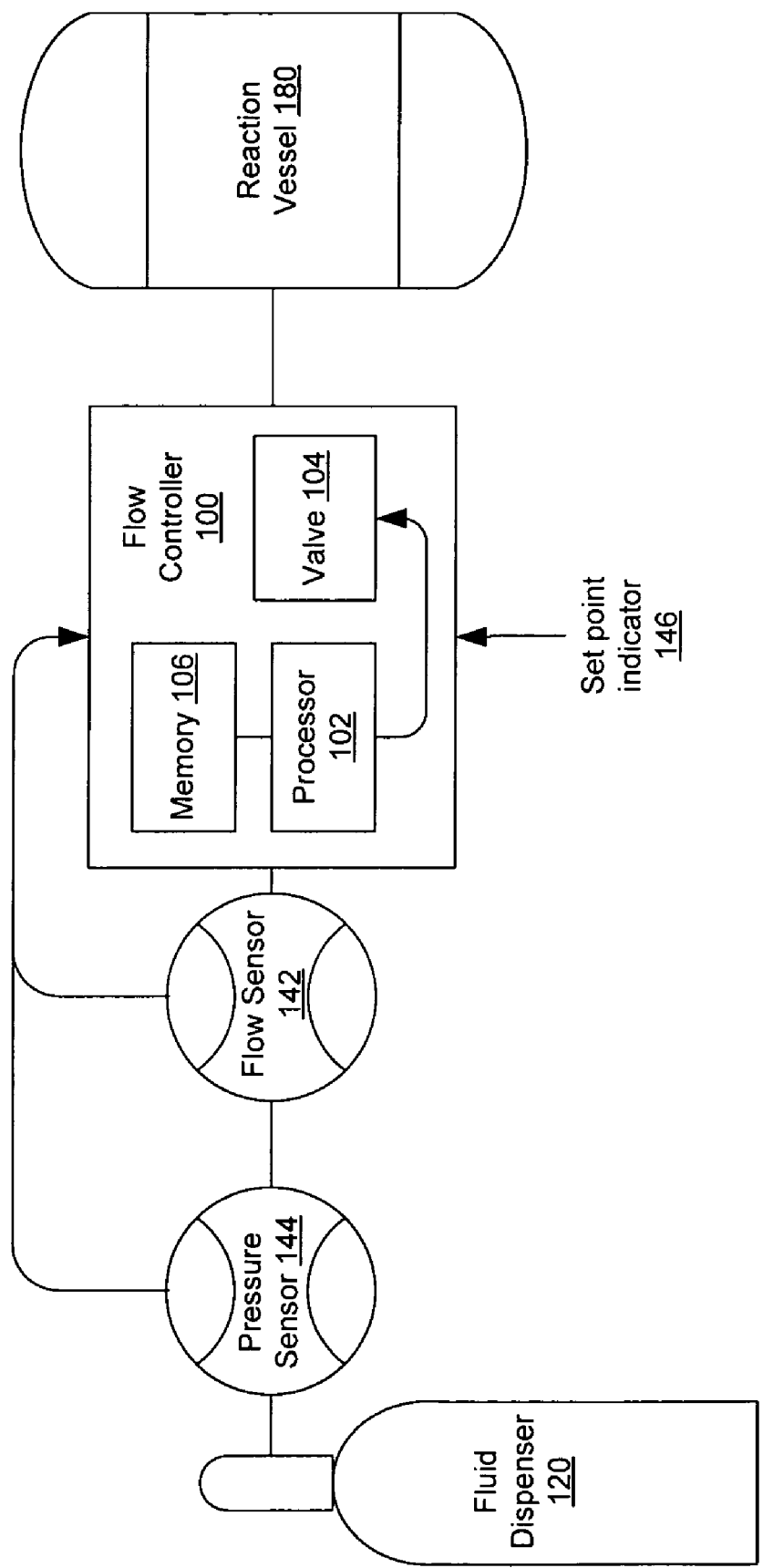
FIG. 1 is a block diagram that illustrates an environment in which a flow controller uses an adaptive closed-loop-control algorithm to control a flow of fluid from a fluid dispenser to a reaction vessel, according to an embodiment of the invention.

In accordance with several embodiments, the present invention is directed to an adaptive closed-loop algorithm (e.g., a proportional-integral-derivative (PID) algorithm) that is implemented on a controller. For example, the controller in some embodiments is a mass flow controller that is configured to deliver a fluid either in a gaseous state (e.g., nitrogen) and/or a liquid state (e.g., hydrochloric acid) to, for example, a tool in a semiconductor facility.

The closed-loop-control algorithm in several embodiments adapted to changing conditions by modifying a response time of the algorithm. As an example, a mass flow controller operating in accordance with many embodiments of the adaptive algorithm is capable of operating with a fast response when an existing flow rate is substantially below a desired flow rate and capable of operating with a slower response, which is less prone to noise, when the existing flow rate is relatively close to the desired flow rate.

In many embodiments for example, the response time of the adaptive algorithm is adjusted when one or more defined threshold conditions are satisfied based on one or more indicators. The response time of the adaptive closed-loop-control algorithm in these embodiments is modified in response to a sensor indicator received from a sensor (e.g., pressure sensor, flow sensor) and/or a set point indicator when the threshold condition(s) is satisfied. The sensor indicator indicates a value of an attribute (e.g., flow rate) associated with a fluid flowing through and controlled by, for example, a valve within a flow controller. The set point indicator indicates the set point used by, for example, a flow controller to control a flow of a fluid.

In several embodiments, the response time of the adaptive closed-loop-control algorithm is modified when a value of at least one of the indicators (e.g., set point indicator and/or sensor indicator) exceeds or falls below a threshold value associated with the indicator. In some embodiments, the response time of the adaptive closed-loop-control algorithm is modified when a calculated value based on a sensor indicator satisfies a threshold condition (e.g., rate of change or maximum allowable change over a specified period of time). For example, in some embodiments, the modification is based on an error signal, which is the difference between a set point and a sensor indicator, satisfying a threshold condition. In other embodiments, the response time of the adaptive closed-loop-control algorithm is modified when a magnitude of a change in at least one of the indicators (e.g., set point and/or sensor) exceeds or falls below a threshold value.

In some embodiments, the response time of the adaptive closed-loop-control algorithm is modified by accelerating and decelerating, for example, a filter (e.g., feedback filter) associated with the closed-loop-control algorithm. In some variations, to stabilize the adaptive closed-loop-control algorithm when the response time is modified, a parameter (e.g., tuning parameter) associated with the adaptive closed-loop-control algorithm is adjusted. In several embodiments, an adaptive gain, for example, is also modified in response to a sensor indicator and/or a set point indicator based on a defined threshold condition. In some implementations, the modifying of the response time of the adaptive closed-loop-control algorithm is based on a timer.

Referring now to the drawings, FIG. 1 illustrates a flow controller 100 that uses an adaptive closed-loop-control algorithm to control a flow of a fluid from a fluid dispenser 120 to a reaction vessel 180. When a change in a measured, calculated, and/or specified value (e.g., pressure indicator value, set point indicator value, flow sensor indicator value) satisfies at least one threshold condition, the adaptive closed-loop-control algorithm is modified from a slow response mode to a fast response mode, and vice versa, by the flow controller 100. The flow controller 100 uses a set point value to control the flow of the fluid from the fluid dispenser 120 to the reaction vessel 180 based on the adaptive closed-loop-control algorithm in the slow or the fast response mode.

In some embodiments, the fluid is a liquid (e.g., sulfuric acid) and in other embodiments a gas (e.g., nitrogen), but a person skilled in the art will appreciate, having the benefit of this disclosure, that the fluid being delivered by the flow controller 100 may be any kind of fluid including, for example, a mixture of elements and/or compounds in any phase, such as a gas or a liquid. The flow controller 100 in many embodiments is configured to deliver a fluid under high pressure, low temperature, or to different types of containers or vessels.

As depicted in FIG. 1, the flow controller 100 in the exemplary embodiment receives indicators from a flow sensor 142 and a pressure sensor 144 that are upstream from the flow controller 100. The indicator from the flow sensor 142 indicates the flow rate of the fluid flowing from the fluid dispenser 120 and controlled by the flow controller 100. The indicator from the pressure sensor 144 indicates the pressure of the fluid from the fluid dispenser 120 and controlled by the flow controller 100. The flow controller also receives a set point indicator 146 that indicates a fluid flow set point. In some embodiments, the flow controller 100 receives an indicator from another device or sensor such as a temperature sensor. In several embodiments, one or more of the sensors are located downstream from the flow controller 100 rather than upstream from the flow controller 100.

The flow sensor 142 in many embodiments is realized by a thermal flow sensor, but in other embodiments a laminar flow sensor, coriolis flow sensor, ultrasonic flow sensor or differential pressure sensor are utilized. The pressure sensor 144 is realized by a gage pressure sensor, differential sensor, absolute pressure sensor or piezoresistive pressure sensor. In variations, the flow sensor 102 and/or pressure sensor 144 are used in combination with any combination of other sensors (e.g., temperature sensors) to accurately measure the flow of the fluid.

The flow controller 100 in this embodiment includes a processor 102, a valve 104, and a memory 106. The memory 106 stores the adaptive closed-loop-control algorithm, which includes a PID control algorithm, filter equations, and parameters associated with the PID control algorithm and filter equations. The memory 106 is any type of appropriate storage device that can be, but is not limited to, flash memory, a random access memory (RAM) and/or a hard disk. The memory 106 also stores parameters (e.g., time periods) and/or equations (e.g., modification rate change equations) related to the modification of the adaptive closed-loop-control algorithm as well as threshold conditions. In this embodiment, the adaptive closed-loop-control algorithm and associated parameters are biased so that the adaptive closed-loop-control algorithm has a slow response time (also referred to as a "slow mode" or "slow response mode"). A specific adaptive closed-loop-control algorithm configuration is discussed in more detail in FIG. 5.

The variable valve 104 is any appropriate type of variable valve that changes the flow of the fluid in any way. For example, the variable valve 104 is a valve with a variable orifice or a valve with multiple pre-set positions. Although FIG. 1 shows that the processor 102, valve 104, and memory 106 are integrated into the flow controller 100 in a single device, in some embodiments, the components are combined and/or separated into different components and/or devices. For example, in some embodiments, the memory 106 is embedded into the processor 102 as, for example, a cache, or is integrated into a separate centralized server (not shown) that stores data for the flow controller 100 or for several distributed and/or cascaded flow controllers. The valve 104, in some implementations, is a separate component from the flow controller 100 that is either upstream or downstream from, for example, the flow sensor 142, pressure sensor 144 and/or flow controller 100. In other implementations, the flow sensor 142 and/or pressure sensor 144 is integrated into the flow controller 100.

In the exemplary embodiment depicted in FIG. 1, threshold conditions associated with the indicators from the sensors 142 and 144 and the set point indicator 146 are also stored in the memory 106. The threshold conditions are defined so that when the threshold conditions are satisfied, the adaptive closed-loop-control algorithm is modified to have a fast response time (also referred to as a "fast mode" or "fast response mode"). The modification from a slow mode to a fast mode can be referred to as acceleration and the modification from a fast mode to a slow mode can be referred to as deceleration. The adaptive closed-loop-control algorithm is modified to have a fast response time by changing the parameters (stored in the memory 106) associated with the algorithm.

In some embodiments, the response time of the adaptive closed-loop-control algorithm is modified by changing filter equations associated with the algorithm rather than changing parameters associated with the algorithm. In some implementations, the processor 102 is designed with, for example, a hardware implemented (e.g., firmware) adaptive closed-loop-control algorithm that accesses and uses parameters stored by the memory 106. In this scenario, the processor 102 adjusts the parameters stored in the memory 106 to modify the response time of the adaptive closed-loop-control algorithm.

The indicators from the sensors 142 and 144 and the set point indicator 146 in this embodiment are processed by the processor 102 using the adaptive closed-loop-control algorithm to control the valve 104 to produce the flow rate specified by the set point indicator 146. When a new set point is received, as indicated by the set point indicator 146, the flow controller 100 uses the adaptive closed-loop-control algorithm to adjust the flow rate of the fluid (e.g., via a control indicator sent to the valve 104) to conform with the new set point.

If a change in set point, however, satisfies a threshold condition, the mode of the closed-loop-control algorithm is modified. For example, if a change in set point, as determined by the processor 102, exceeds a set-point-change threshold condition (e.g., a maximum allowable set point change) the processor 102 modifies the adaptive closed-loop-control algorithm to have a fast mode. The processor 102 then controls the flow of fluid by sending control signals to the valve 104 based on the new set point and according to the adaptive closed-loop-control algorithm in the fast mode. When the new set point is reached, the processor 102 modifies the adaptive closed-loop-control algorithm, by adjusting parameters associated with the algorithm from the fast mode back to the slow mode.

Similarly, if a change in as sensor indicator satisfies a threshold condition, the processor 102 modifies the adaptive closed-loop-control algorithm from a slow mode to a fast mode and/or vice versa. In this embodiment, the processor 102 within the flow controller 100 is programmed to modify the adaptive closed-loop-control algorithm when a flow rate as indicated by the flow sensor 142 satisfies a threshold condition. For example, a modification of the adaptive closed-loop-control algorithm is triggered when the magnitude of a flow rate change, prompted by, for example, a change in pressure, exceeds a maximum allowable value within a specified period of time. When the flow rate of the fluid is aligned once again to the set point as indicated by the set point indicator 146, the processor 102 modifies the adaptive closed-loop-control algorithm from the fast response time configuration back to the slow response time configuration. In some embodiments, if the processor 102 detects that a change in, for example, a pressure sensor indicator exceeds a threshold condition associated with a change in pressure, the processor 102 is configured to modify the adaptive closed-loop-control algorithm from a slow mode to a fast mode and/or vice versa In some implementations, the level of modification of an adaptive closed-loop-control algorithm is based on the magnitude of a change relative to a threshold value. For example, if a set point change far exceeds a set-point-change threshold condition the parameters and/or filters associated with the adaptive closed-loop-control algorithm are modified more than if the set point change had barely satisfied the set-point-change threshold condition.

Figure 2:
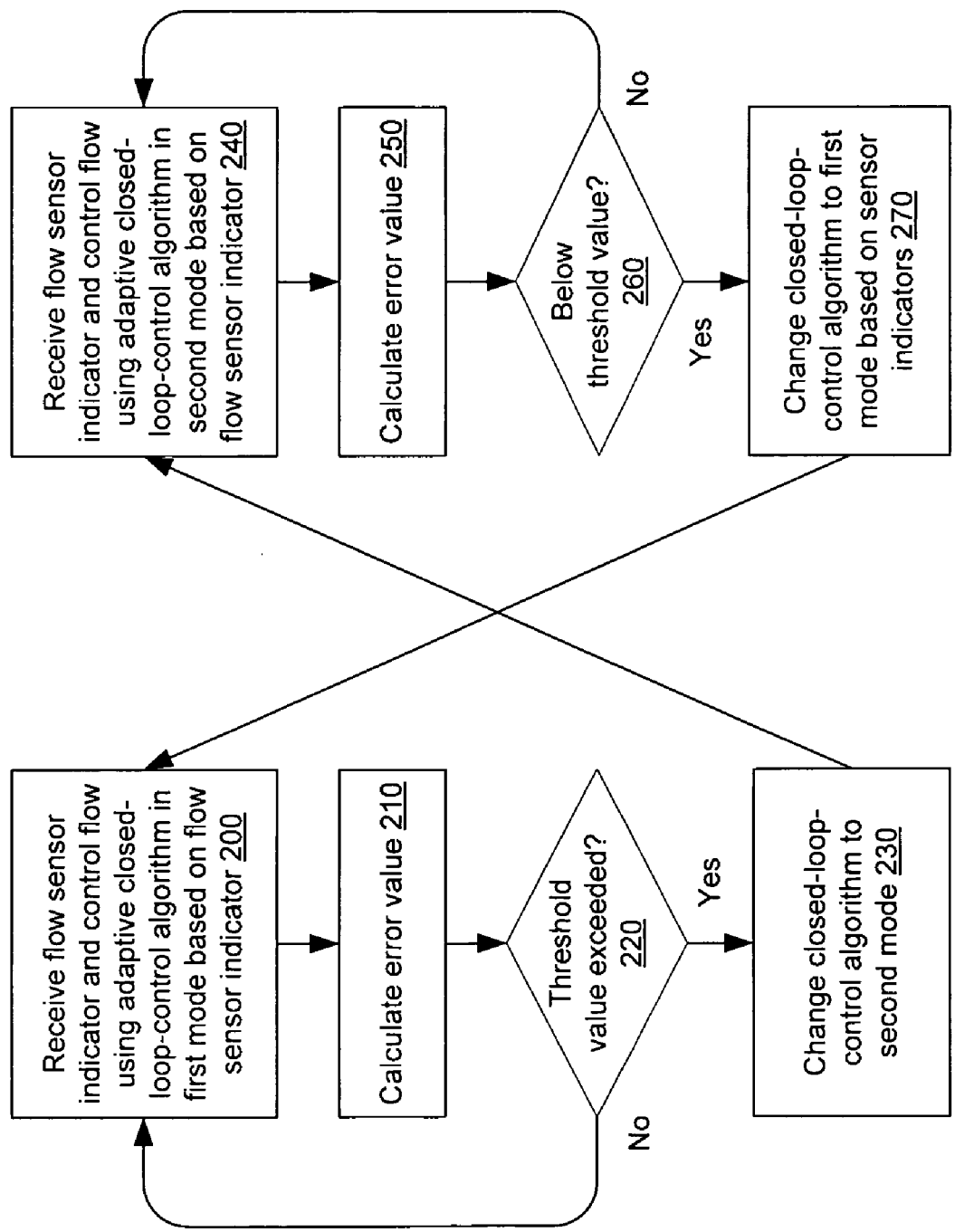
FIG. 2 is a flowchart that shows a method for modifying an adaptive closed-loop-control algorithm, according to an embodiment of the invention.

Referring now to FIG. 2, it includes a flowchart that shows a method for modifying an adaptive closed-loop-control algorithm from a first mode to a second mode based on a defined threshold condition. The first mode is, for example, a slow, low noise mode, and the second mode is, for example, a fast and potentially noisy mode. In this embodiment, the threshold condition is defined as a magnitude of an error that (e.g., threshold value), when exceeded by a calculated error value, triggers a modification of the adaptive closed-loop-control algorithm from the first mode to the second mode. The error value in many embodiments is the difference between a flow rate set point and a measured flow rate as indicated by a flow indicator. At a later time when the error value falls below the threshold value (e.g., no longer satisfied), the adaptive closed-loop-control algorithm is modified from the second mode back to the first mode. Although in this embodiment, the error value is calculated based on flow set points and measurements, the error value in other embodiments is based on other set points and measurements such as pressure set points and measurements.

As shown in FIG. 2, a flow sensor indicator is received and a flow of a fluid is controlled according to a flow set point using an adaptive closed-loop-control algorithm in the first mode based on the flow sensor indicator at 200. As shown, an error value is calculated at 210 as the difference between a flow rate indicated by the flow sensor indicator and the flow set point. If the error value does not exceed a defined threshold value at 220, the flow sensor indicator continues to be received and fluid flow continues to be controlled using the adaptive closed-loop control algorithm in the first mode 200. When the calculated error value at 210 exceeds the threshold value at 220, the adaptive closed-loop-control algorithm is modified from the first mode to the second mode 230.

As shown in FIG. 2, once the adaptive closed loop algorithm is modified to the second mode, a flow sensor indicator is received and the fluid flow is controlled using the adaptive closed-loop-control algorithm in the second mode based on the flow sensor indicator at 240. The adaptive closed-loop-control algorithm in the second mode is used to control the flow of the fluid according to the flow set point. Error values are continuously (or intermittently in some embodiments) calculated at 250 based on flow sensor indicators and the flow set point. If calculated error values continue to exceed the threshold value at 260, the flow sensor indicator continues to be received and fluid flow is controlled using the adaptive closed-loop control algorithm in the second mode at 240.

When the calculated error value at 250 falls below the threshold value at 260, the adaptive closed-loop-control algorithm is modified from the second mode back to the first mode at 270.

Although this embodiment describes a method involving a flow sensor indicator and calculated error value based on the flow sensor indicator, in some embodiments, a temperature sensor indicator is received from a temperature sensor and analyzed with respect to a threshold value associated with temperature. In several embodiments, multiple sensors (e.g., flow, temperature, and pressure sensors) are monitored with reference to corresponding threshold values to determine whether an adaptive closed-loop-control algorithm should be modified from a first mode to a second mode and vice versa. In some embodiments, the threshold condition is defined based on a set point indicator value rather than on a sensor indicator error value.

The threshold condition, in some variations, is based on a rate of change of, for example, an error value from an indicator. The values (i.e., parameters) within a threshold condition, in several implementations, is defined based on empirical data related to, for example, a specific flow controller(s).

In some embodiments, a threshold value for modifying an adaptive closed-loop-control algorithm from a first mode to a second mode is different than a threshold value used for determining a change of the algorithm from the second mode back to the first mode. In yet other embodiments, a threshold condition is based on a complex combination (e.g., subtracted, multiplied) of values (e.g., time, pressure, etc.) or boolean conditions (e.g., "or" boolean condition). For example, the threshold condition is only satisfied when the values (or calculated values) derived from both a temperature indicator and a pressure indicator exceed their respective corresponding threshold values. In several embodiments, the adaptive closed-loop-control algorithm is modified to one of several modes (e.g., moderately fast mode) based on threshold conditions that correspond with one or more of the modes.

In some embodiments a threshold condition is defined, for example, so that the adaptive closed-loop-control algorithm is modified only if more than three consecutive pressure indicator values and/or error values exceed a threshold value. By defining the threshold condition in this manner, the adaptive closed-loop-control algorithm is held in a specified response time mode before being modified. In some embodiments, a threshold condition is defined, for example, so that the adaptive closed-loop-control algorithm is modified only if pressure indicator values exceed a threshold value for more than, for example, 300 milliseconds.

Figure 3:
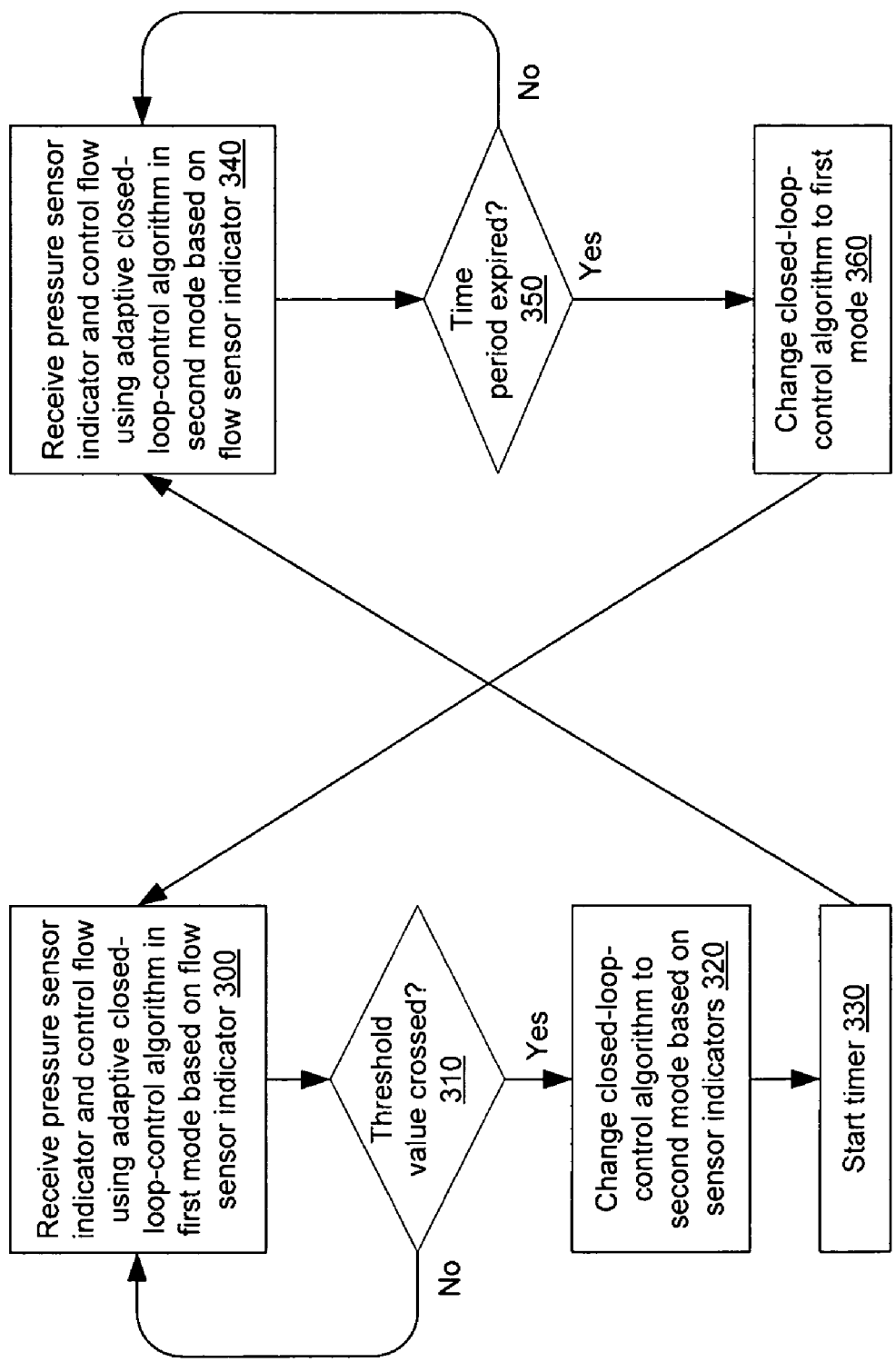
FIG. 3 is a flowchart that shows a method for modifying an adaptive closed-loop-control algorithm, according to another embodiment of the invention.

FIG. 3 is a flowchart that shows a method for modifying an adaptive closed-loop-control algorithm based on a defined threshold condition and based on a timer. In this embodiment, the threshold condition is a pressure value that, when exceeded by a value indicated by a pressure sensor indicator from a pressure sensor, triggers a modification of the adaptive closed-loop-control algorithm from the first mode to the second mode. The adaptive closed-loop-control algorithm is modified from the second mode back to the first mode when the timer expires.

As shown in FIG. 3, a pressure sensor indicator is received and a flow of a fluid is controlled using an adaptive closed-loop-control algorithm in the first mode based on a flow sensor indicator at 300. The pressure sensor indicator is continuously (or intermittently in some embodiments) analyzed with reference to a threshold value at 310 when received. If a pressure value as indicated by the pressure sensor indicator does not exceed the threshold value at 310, the pressure sensor indicator continues to be received and fluid flow continues to be controlled using the adaptive closed-loop control algorithm in the first mode at 300.

When a pressure value as indicated by a pressure sensor indicator exceeds the threshold value at 310, the adaptive closed-loop-control algorithm is modified from the first mode to the second mode at 320 and a timer is started at 330. In this embodiment, the timer runs for a time period of 3 seconds. Pressure sensor indicators are received and fluid flow is controlled using the adaptive closed-loop-control algorithm in the second mode based on flow sensor indicators 340 until the time period expires.

If the time period has not expired at 350 as determined by the timer, the pressure sensor indicator continues to be received and fluid flow is controlled based the algorithm in the second mode at 340. When the time period has expired at 350, the adaptive closed-loop-control algorithm is modified from the second mode back to the first mode at 360.

In some embodiments, the length of the time period depends on factors such as response time of flow controllers or deviation of a sensor indicator above the corresponding threshold value. For example, in some embodiments, the time period used by the timer is longer when a value from a sensor exceeds a threshold value by a large amount than when a value from the sensor exceeds the threshold value by a small amount. In several embodiments, the adaptive closed-loop-control algorithm is modified from a first mode to a second mode according to a mathematical equation so that the modification occurs, for example, at a slow rate rather than abruptly. In some embodiments, the rate of modification and/or level of modification (e.g., , the level of acceleration or deceleration) of an adaptive closed-loop-control algorithm from one mode to another depends on, for example, whether flow is increasing or decreasing.

Figure 4:
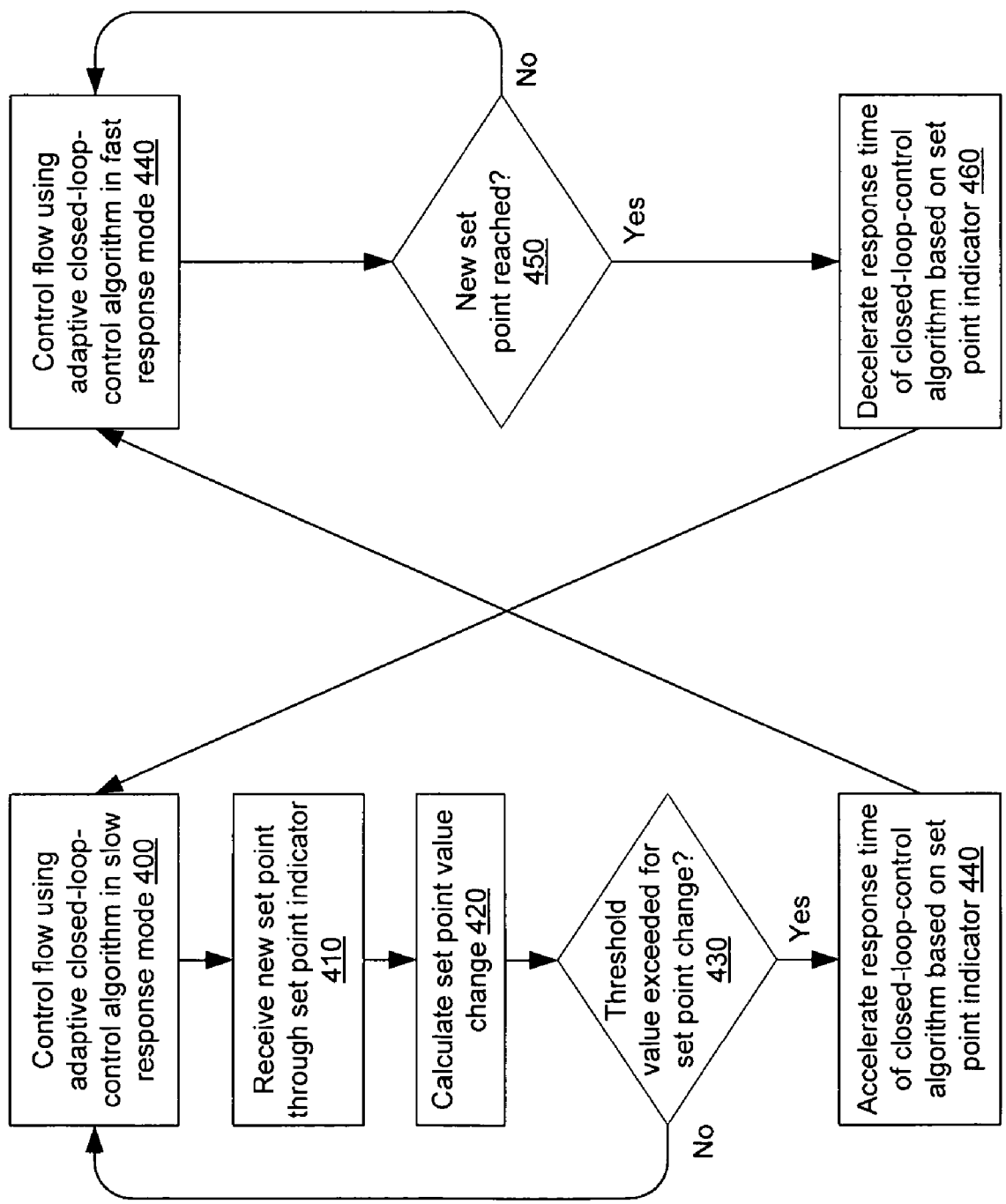
FIG. 4 is a flowchart that shows a method for modifying an adaptive closed-loop-control algorithm, according to yet another an embodiment of the invention.

Referring now to FIG. 4, it is a flowchart that shows a method for modifying an adaptive closed-loop-control algorithm from a slow response mode to a fast response mode based on a set-point-change threshold condition. In this embodiment, the set-point-change threshold condition is a magnitude of set point change that, when exceeded by a set point change, triggers a modification of the adaptive closed-loop-control algorithm from the slow response mode to the fast response mode.

As shown in FIG. 4, in this embodiment a fluid flow is controlled using the adaptive closed-loop-control algorithm in a slow mode at 400. When a set point indicator is received indicating a new set point at 410, the change in set point is calculated at 420 and the change in set point is compared with a defined threshold value at 430. When the set point change is less than the threshold value at 430, fluid flow is controlled and adjusted to the new set point using the adaptive closed-loop-control algorithm in the slow response mode at 400. When the set point change is greater than the threshold value at 430, the adaptive closed-loop-control algorithm is accelerated (e.g., modified) from the slow mode to the fast mode 440.

As shown in FIG. 4, fluid flow is then controlled using the adaptive closed-loop-control algorithm in the fast response mode at 440 until the new set point is reached at 450. When the new set point has not been reached, fluid flow continues to be controlled using the adaptive closed-loop-control algorithm in the fast response mode at 440. When the new set point has been reached, the adaptive closed-loop-control algorithm is decelerated (e.g., modified) from the fast response mode to the slow response mode at 460. Fluid flow is then controlled using the adaptive closed-loop-control algorithm in the slow response mode at 400.

In this embodiment, the algorithm is biased to control the flow of fluid in the slow response mode and only changes to the fast response mode when large set point changes occur. In some embodiments, the adaptive closed-loop-control algorithm is biased to control the flow of fluid in, for example, a fast response mode. In some embodiments, the speed of the response mode is based on the magnitude of the set point change. For example, the response mode is accelerated to one of several fast response modes that depend on the magnitude of the set point change as defined in one or more threshold conditions. In other embodiments, the threshold value for a set point change is zero so that the response time of the closed-loop-control algorithm is changed for any set point change.

Figure 5:
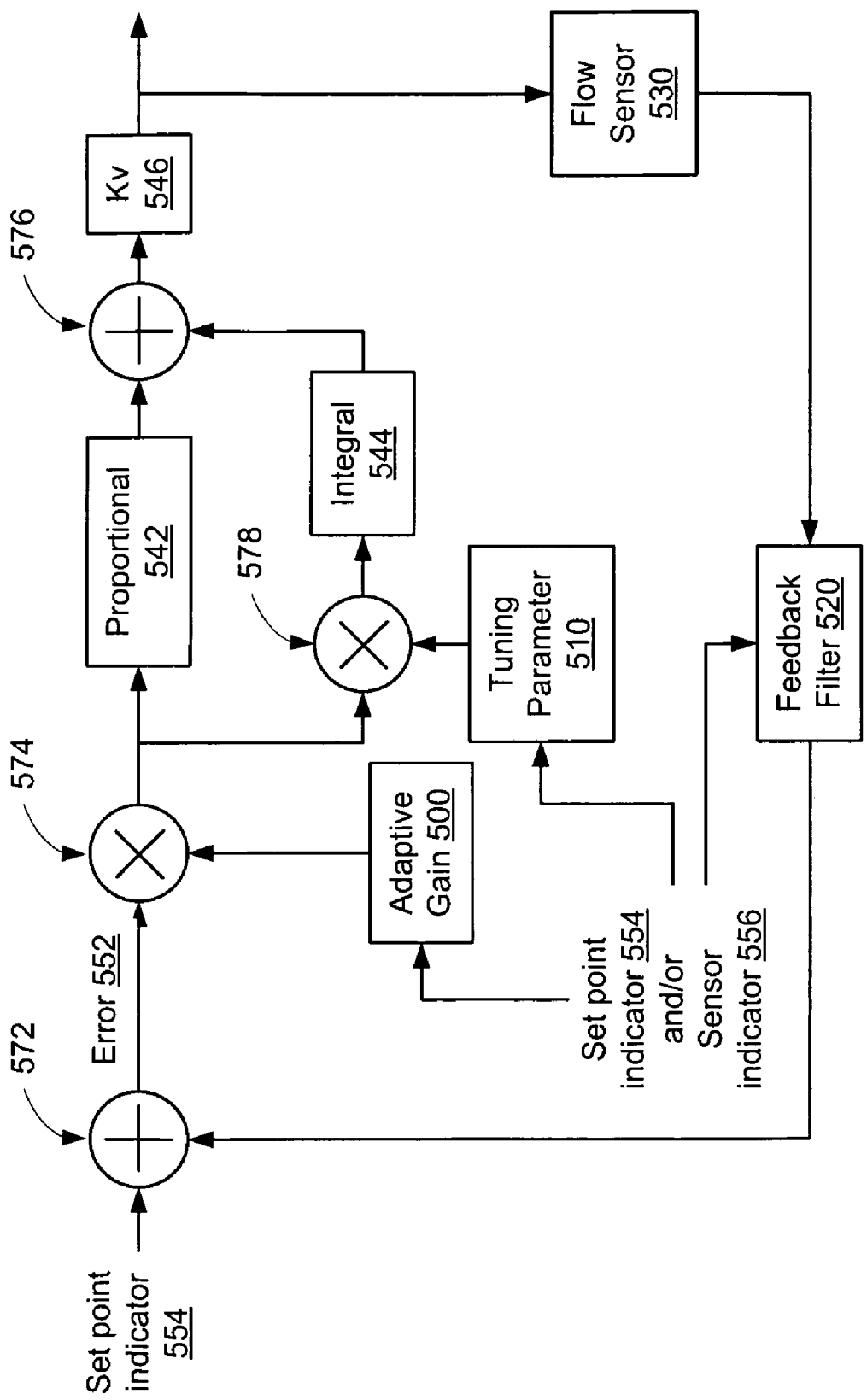
FIG. 5 is a signal flow diagram of an adaptive closed-loop-control algorithm, according to an embodiment of the invention.

FIG. 5 is a signal flow diagram of an exemplary adaptive closed-loop-control algorithm. Each of the blocks within the exemplary adaptive closed-loop-control algorithm is realized by a combination of equations with associated parameters and constants. The adaptive close-loop-control algorithm in this embodiment is based on a proportional-integral (PI) controller that includes a proportional control block 542 and an integral control block 544. A tuning parameter 510 and a feedback filter 520 are used to modify the response time of the closed-loop-control algorithm when a threshold condition is satisfied based on the values of a set point indicator 554, a sensor indicator 556, and/or a value derived (e.g., calculated error) using the set point indicator 554 and/or sensor indicator 556. The set point indicator 554 indicates a fluid flow set point. The sensor indicator 556 includes a pressure sensor indicator from a pressure sensor (not shown) and a flow sensor indicator produced by the flow sensor 530. In some embodiments, the sensor indicator 556 includes other sensor indicators such as temperature sensor indicators.

As shown in FIG. 5, in this embodiment a flow indicator (e.g., signal) from a flow sensor 530 is adjusted through the feedback filter 520 and subtracted at 572 from the set point indicated by the set point indicator 554 to produce an error 552. A product 574 of the error 552 and an adaptive gain 500 is used by the PI controller to control a valve Kv 546. The equations, parameters and/or constants in blocks 500, 510, 520, 530, 542, 544, and 546 are selected to stabilize the adaptive closed-loop-controller algorithm and to attain, for example, a specified response time and/or transient waveform (e.g., overshoot, damping) in each response time mode.

This embodiment also includes an adaptive gain 500 that is continuously (or intermittently in some embodiments) adjusted based on the values of the set point indicator 554, sensor indicator 556 and/or values calculated using any combination of the set point indicator 554 and sensor indicator 556. In some embodiments, the adaptive gain 500 is adjusted when a threshold condition is satisfied based on the set point indicator 554 and/or sensor indicator 556. The adaptive gain 500 is configured to correct for non-linearities such as, for example, Kv 546 non-linearities or non-linear pressure effects. The adaptive gain 500 affects the speed of further valve position adjustment as calculated using the adaptive closed-loop-control algorithm. The adaptive gain 500 is calculated based on, for example, flow sensitivity, valve sensitivity, and/or pressure sensitivity. With a proper adaptive gain 500, the adaptive closed-loop-control algorithm is stable and has similar performance over ranges of, for example, pressures and/or set points.

The tuning parameter 510 and feedback filter 520 are modified when the set point indicator 554, sensor indicator 556 and/or a value derived (e.g., calculated error) using the set point indicator 554 and/or sensor indicator 556 satisfies a defined threshold condition. The tuning parameter 510 is modified substantially at the same time as the feedback filter 520 to stabilize the adaptive closed-loop-control algorithm when the feedback filter 520 is accelerated and/or decelerated.

In some embodiments, the tuning parameter 510 and feedback filter 520 are adjusted based on different threshold conditions or combination threshold conditions. In some embodiments, rate and even waveform of parameters being adjusted when modifying the adaptive closed-loop-control algorithm are modified depending on whether fluid flow is increasing or decreasing. In several embodiments, the adaptive closed-loop-control algorithm includes, for example, derivative control in addition to proportional and integral control. In other embodiments, the control algorithm includes other combinations of proportional, integral, and/or derivative control. In several variations, the tuning parameter 510 is associated with a portion of the closed-loop-control algorithm (e.g., included as a parameter in the integral control block 544 or associated with a derivative control block).

FIGS. 6A-6G are graphs that show exemplary measurements, signals, and calculated values related to an exemplary set point change that triggers an exemplary modification of a feedback filter within an adaptive closed-loop-control algorithm. The adaptive closed-loop-control algorithm in this embodiment is implemented on a flow controller that is controlling the flow of a fluid through a valve according to the set point.

Figure 6A:
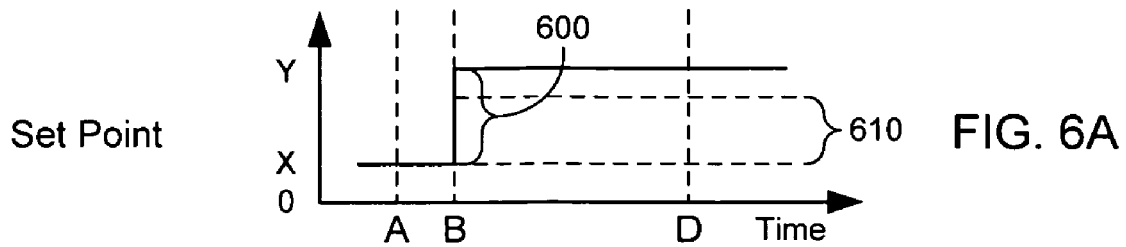
FIG. 6A is a graph that shows a set point as indicated by a set point indicator, according to an embodiment of the invention.

FIG. 6A is a graph that shows a set point as indicated by a set point indicator. FIG. 6A shows the set point change from X to Y at time B. FIG. 6A shows that the magnitude of the set point change 600 is larger than the set-point-change threshold condition 610, triggering a modification of the adaptive closed-loop-control algorithm.

Figure 6B:
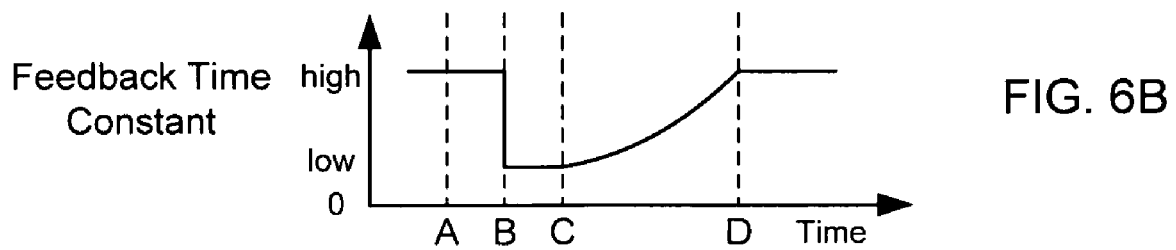
FIG. 6B is a graph that shows a value of a feedback time constant associated with a feedback filter within an adaptive closed-loop-control algorithm, according to an embodiment of the invention.

FIG. 6B is a graph that shows a value of a feedback time constant associated with the feedback filter within the adaptive closed-loop-control algorithm. FIG. 6B shows that at time B, the feedback time constant is changed from a high value shown at time A to a low value at time B in response to the set-point-change threshold condition being satisfied as shown in FIG. 6A. A high value causes the adaptive closed-loop-control algorithm to have a slow response time while a low value for a feedback time constant results in a faster response time for the adaptive closed-loop-control algorithm. FIG. 6B shows that the value of the feedback time constant is slowly increased starting at time C until the value of the feedback time constant reaches its original value at time D. The value of the feedback time constant is held at the low value for a defined time period between B and C before the value of the feedback time constant is slowly increased. Although not shown, a tuning parameter is adjusted at substantially the same time as the feedback time constant to stabilize the adaptive closed-loop-control algorithm.

Figure 6C:
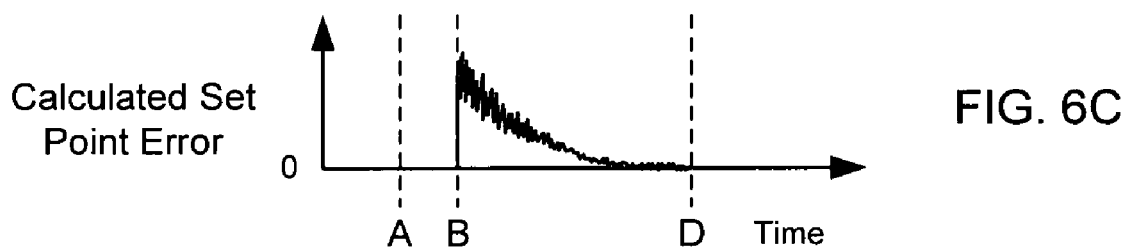
FIG. 6C is a graph that shows a set point error as calculated by an adaptive closed-loop-control algorithm, according to an embodiment of the invention.

FIG. 6C is a graph that shows a set point error as calculated by the adaptive closed-loop-control algorithm. FIG. 6C shows that the calculated set point error is zero before the set point change at time B shown in FIG. 6A. FIG. 6C shows that when the set point changes at time B, the calculated set point error increases instantaneously. As the adaptive closed-loop-control algorithm responds to the calculated set point error, the set point error decreases until the set point is reached at time D when the error decreases to zero. FIG. 6C shows that while the adaptive closed-loop-control algorithm in this embodiment is in a fast response mode, the calculated set point error is noisy. The curves in FIGS. 6D-6G, like the curve in FIG. 6C, exhibit noise while the adaptive closed-loop-control algorithm is in a fast response mode.

Figure 6D:
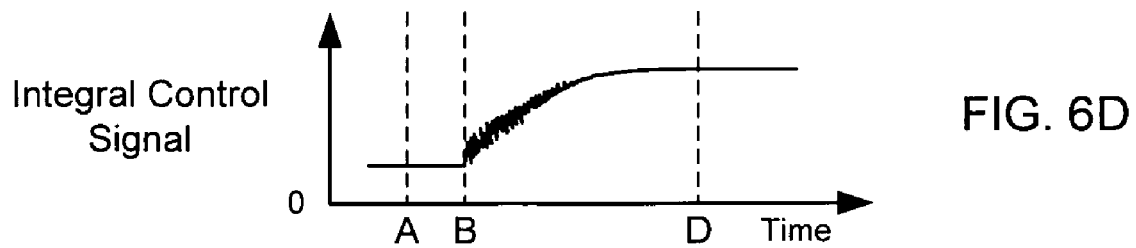
FIG. 6D is a graph that shows an integral control signal calculated using an adaptive closed-loop-control algorithm, according to an embodiment of the invention.

FIG. 6D is a graph that shows an integral control signal calculated using the adaptive closed-loop-control algorithm.

FIG. 6D shows that the integral control signal increases when the set point changes at time B until the signal is stabilized at time D.

Figure 6E:
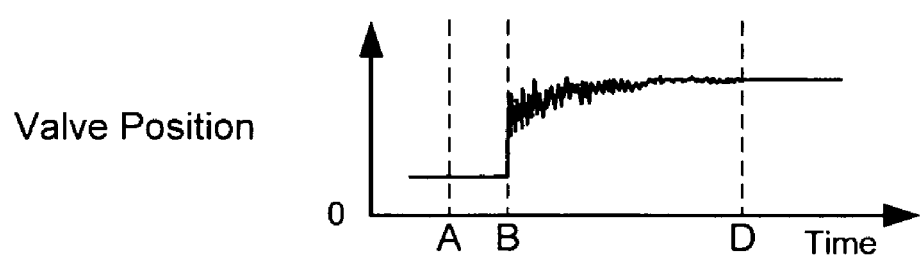
FIG. 6E is a graph that shows a valve position of a valve that is controlled by a flow controller implementing an adaptive closed-loop-control algorithm, according to an embodiment of the invention.

FIG. 6E is a graph that shows a valve position of the valve that is controlled by the flow controller implementing the adaptive closed-loop-control algorithm. FIG. 6E shows that the valve position changes in response to the set point change at time B until it reaches a steady-state position at time D.

Figure 6F:
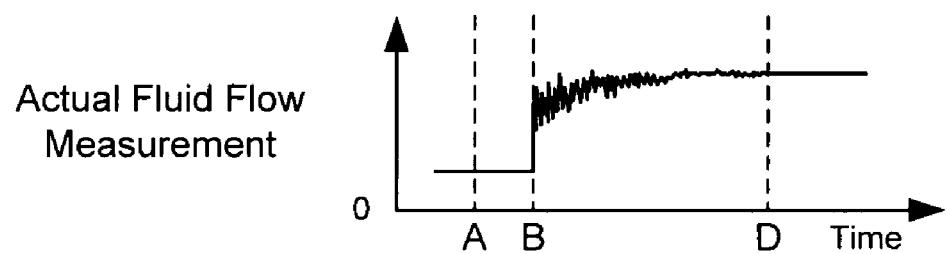
FIG. 6F is a graph that shows an actual flow of a fluid through a valve that is controlled using an adaptive closed-loop-control algorithm, according to an embodiment of the invention.

FIG. 6F is a graph that shows an actual flow of fluid through the valve that is controlled using the adaptive closed-loop-control algorithm. FIG. 6F shows that the actual fluid flow measurement tracks with the valve position in FIG. 6E.

Figure 6G:
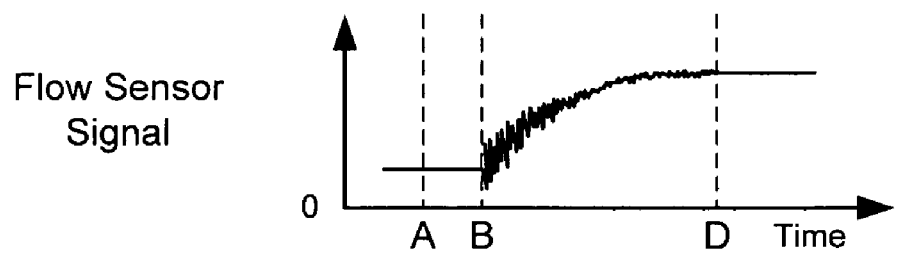
FIG. 6G is a graph that shows a signal from a flow sensor measuring a flow of a fluid through a valve that is controlled using an adaptive closed-loop-algorithm, according to an embodiment of the invention.

FIG. 6G is a graph that shows a signal from a flow sensor measuring the flow of fluid flowing through the valve that is controlled using the adaptive closed-loop-algorithm. FIG. 6G shows that the flow sensor signal, which has a slow response time, lags behind the actual fluid flow measurement in FIG. 6F.

In conclusion, the present invention provides a system and method for controlling a flow of a fluid using an adaptive closed-loop-control algorithm. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for adapting a response time of a mass flow controller while the mass flow controller is controlling flow of a fluid to a reaction vessel, comprising:
   receiving a set point indicator, the set point indicator indicating a desired flow rate of the fluid;
   receiving a sensor indicator generated by a sensor, the sensor indicator indicating a flow rate of the fluid being delivered to the vessel;
   biasing the response time of a closed loop control algorithm to a slow mode;
   briefly modifying the closed-loop-control algorithm to a fast mode when at least one threshold condition is satisfied based on the at least one of the sensor indicator or the set point indicator, the closed-loop-control algorithm affecting the rate which a valve in the mass flow controller changes position to provide the desired flow rate;
   gradually modifying the closed-loop-control algorithm back to the slow mode;
   stabilizing the closed-loop-control algorithm in response to the modifying the response time of the closed-loop-control algorithm by adjusting at least one parameter associated with the closed-loop-control algorithm.

2. The method of claim 1, further comprising detecting a change in the at least one of the sensor indicator or the set point indicator, the at least one threshold condition is satisfied by the change.

3. The method of claim 1, further comprising detecting a rate of change in the at least one of the sensor indicator or the set point indicator, the at least one threshold condition is satisfied by the rate of change.

4. The method of claim 1, wherein:
   the at least one threshold condition is based on a flow rate error value, the flow rate error value is a difference between the fluid flow set point and the flow rate of the fluid.

5. The method of claim 1, wherein the accelerating or decelerating includes accelerating or decelerating in response to a change in a fluid flow rate through the flow controller and according to a mathematical equation.

6. The method of claim 1, wherein the modifying includes modifying at least one filter associated with the closed-loop-control algorithm.

7. The method of claim 1, wherein the modifying includes accelerating a response time of a feedback filter by adjusting a time constant associated with the feedback filter, the feedback filter being associated with the closed-loop-control algorithm.

8. The method of claim 1, wherein the at least one parameter is a tuning parameter associated with the closed-loop-control algorithm.

9. The method of claim 1, wherein the stabilizing includes stabilizing based on the at least one of the sensor indicator or the set point indicator.

10. The method of claim 1, wherein the closed-loop-control algorithm is based on at least one of proportional control, integral control, or derivative control.

11. The method of claim 1, wherein the sensor is at least one of a flow sensor, a timer, a pressure sensor or a temperature sensor.

12. A method for adapting a response time of a mass flow controller while the mass flow controller is controlling flow of a fluid to a processing vessel, comprising:
   receiving a set point indicator, the set point indicator indicating a desired flow rate of the fluid;
   receiving a sensor indicator generated by a sensor, the sensor indicator indicating a flow rate of the fluid being delivered to the vessel;
   biasing the response time of a closed loop control algorithm to a slow mode;
   modifying, while the mass flow controller is controlling flow of a fluid to a processing vessel, a feedback filter from a slow mode to a fast mode based on the at least one of the sensor indicator or the set point indicator, the feedback filter being associated with a closed-loop-control algorithm, the closed-loop-control algorithm being associated with a flow controller;
   gradually modifying the feedback filter back to the slow mode; and
   changing a tuning parameter associated with the closed-loop-control algorithm based on the modifying the feedback filter, the tuning parameter being changed to stabilize the closed-loop-control algorithm when the feedback filter is modified.

13. The method of claim 12, wherein the modifying the adaptive-gain based on the at least one of the sensor indicator or the set point indicator, the adaptive-gain is used in the closed-loop-control algorithm to compensate for at least one non-linear characteristic associated with the flow controller, the modifying the adaptive-gain includes modifying in response to a change in a fluid flow rate through the flow controller and according to a mathematical equation.

14. The method of claim 12, wherein the modifying the feedback filter includes modifying a response time associated with the feedback filter by adjusting a time constant associated with the feedback filter.

15. The method of claim 12, wherein the closed-loop-control algorithm is based on at least one of proportional control, integral control, or derivative control.

16. The method of claim 12, wherein the tuning parameter is associated with an integral control portion of the closed-loop-control algorithm.

17. The method of claim 12, wherein the sensor is at least one of a flow sensor, a timer, a pressure sensor or a temperature sensor.

18. The method of claim 12, wherein the modifying the feedback filter includes modifying in response to a change in a fluid flow rate through the flow controller and according to a mathematical equation.

19. The method of claim 12, wherein a response time of the closed-loop-control algorithm is different when the feedback filter is in the 4h4 fast mode than when the feedback filter is in the slow mode.

20. The method of claim 12, wherein the modifying the feedback filter includes modifying with reference to at least one threshold value associated with the at least one of the sensor indicator or the set point indicator.

21. The method of claim 12, wherein the gradually modifying the feedback filter includes gradually modifying the feedback filter in response to a change in a fluid flow rate through the flow controller and according to a mathematical equation.

22. A mass flow controller, comprising:
   a processor configured to bias a response time of a closed loop control algorithm to a slow mode and to briefly modify the response time of the closed-loop-control algorithm from the slow mode to a fast mode when at least one threshold value is satisfied based on at least one of a sensor indicator generated by a sensor indicating a flow rate of a fluid being delivered to a processing vessel or a set point indicator indicating a desired flow rate of the fluid, the processor modifies the response time of the closed-loop-control algorithm by modifying a feedback filter associated with the closed-loop-control algorithm and a tuning parameter associated with the closed-loop-control algorithm, and the processor gradually modifies the closed-loop-control algorithm back to the slow mode; and
   a memory configured to store a parameter associated with at least one of the feedback filter and the tuning parameter, the processor accesses the parameter from the memory.

23. The mass flow controller of claim 22, further comprising a valve configured to open and close in response to a control indicator, the control indicator being generated by the processor based on the closed-loop-control algorithm.

24. The mass flow controller of claim 22, wherein the sensor is at least one of a flow sensor, a timer, a pressure transducer or a temperature sensor.

25. The mass flow controller of claim 22, further comprising a memory that is configured to store the at least one threshold value, the processor is configured to access the at least one threshold value from the memory.

* * * * *